United States Patent
Skovgaard-Soerensen et al.

(10) Patent No.: US 7,827,980 B2
(45) Date of Patent: Nov. 9, 2010

(54) METHOD FOR SLICING A MULTIPLICITY OF WAFERS FROM A WORKPIECE

(75) Inventors: Frank Skovgaard-Soerensen, Halsbruecke (DE); Matthias Mahnke, Freiberg (DE); Thomas Kasinger, Pischelsdorf (AT)

(73) Assignee: Siltronic AG, Munich (DE)

( * ) Notice: Subject to any disclaimer, the term of this patent is extended or adjusted under 35 U.S.C. 154(b) by 518 days.

(21) Appl. No.: 11/953,892

(22) Filed: Dec. 11, 2007

(65) Prior Publication Data

US 2008/0141994 A1 Jun. 19, 2008

(30) Foreign Application Priority Data

Dec. 13, 2006 (DE) .................. 10 2006 058 823

(51) Int. Cl.
*B28D 1/08* (2006.01)
*B24B 49/00* (2006.01)
(52) U.S. Cl. .................. 125/21; 451/11; 451/41
(58) Field of Classification Search ............... 125/21; 451/5, 11, 41
See application file for complete search history.

(56) References Cited

U.S. PATENT DOCUMENTS

| | | | | |
|---|---|---|---|---|
| 3,841,297 A | * | 10/1974 | Mech | 125/21 |
| 4,655,191 A | * | 4/1987 | Wells et al. | 125/21 |
| 5,771,876 A | | 6/1998 | Egglhuber | |
| 6,062,209 A | * | 5/2000 | Oishi | 125/16.01 |
| 6,109,253 A | | 8/2000 | Ikehara | |
| 2010/0006082 A1 | * | 1/2010 | Glinski et al. | 125/16.02 |

FOREIGN PATENT DOCUMENTS

JP 9262826 A 10/1997

* cited by examiner

*Primary Examiner*—Maurina Rachuba
(74) *Attorney, Agent, or Firm*—Brooks Kushman P.C.

(57) ABSTRACT

A multiplicity of wafers are sliced from a workpiece which has a longitudinal axis and a cross section, the workpiece fastened on a table being fed by a relative movement directed perpendicularly to the longitudinal axis of the workpiece between the table and the wire gang of a wire saw, with a variable forward feed rate through the wire gang formed by a sawing wire moved with an effective speed, the effective speed of the sawing wire being regulated as a function of the forward feed rate and the workpiece cross section so as to result in uniform wear of the sawing wire.

11 Claims, 6 Drawing Sheets

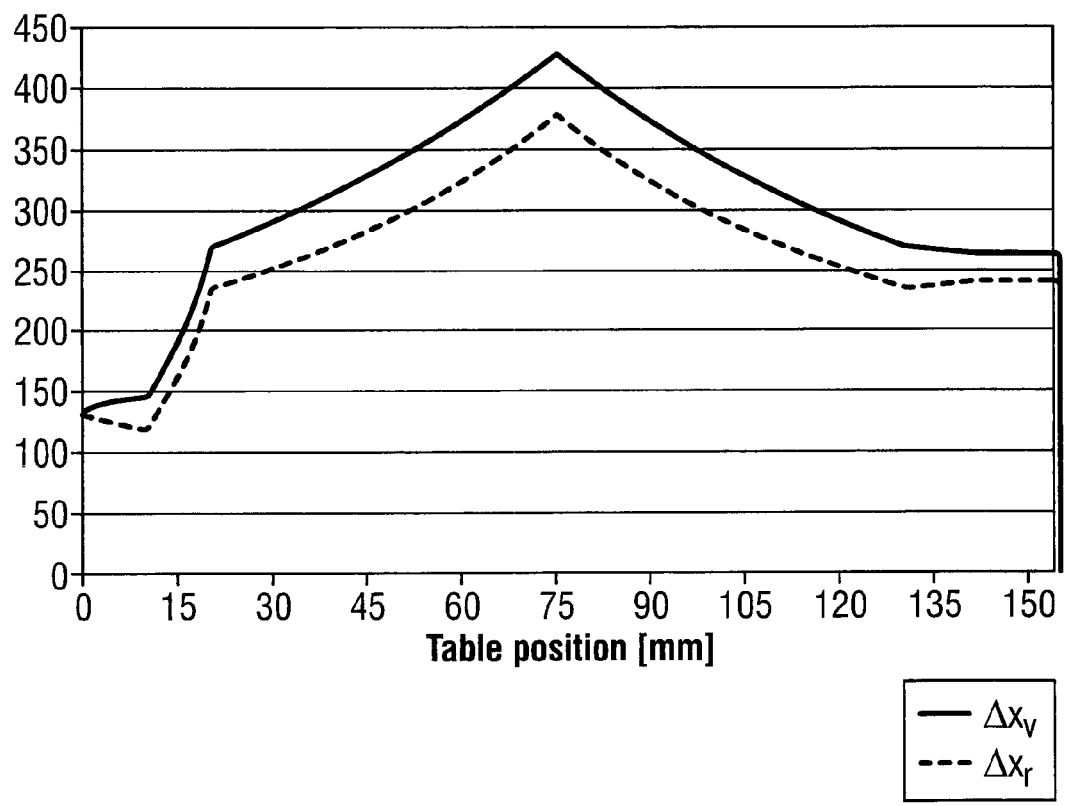

METHOD FOR SLICING A MULTIPLICITY OF WAFERS FROM A WORKPIECE

BACKGROUND OF THE INVENTION

1. Field of the Invention

The invention relates to a method for slicing a multiplicity of wafers from a workpiece by means of a wire saw.

2. Background Art

Wire saws are suitable, for example, for slicing a multiplicity of semiconductor wafers, solar wafers and other crystal wafers from a crystal piece in one working step. The functional principle of such a wire saw is described in U.S. Pat. No. 5,771,876. Wire saws have a wire gang, which is formed by a sawing wire that is wound around two or more wire feed or guide rolls. The sawing wire may be covered with a cutting layer. When using wire saws having a sawing wire without firmly bound cutting abrasive, cutting abrasive in the form of a suspension (slurry) is supplied during the slicing process.

During the slicing process, the workpiece fastened on a table passes through the wire gang, in which the sawing wire is arranged in the form of wire sections lying parallel to one another. The passage through the wire gang is brought about by means of a relative movement between the table and the wire gang, induced by means of a forward feed device, which feeds the workpiece against the wire gang (table forward feed) or the wire gang against the workpiece.

Conventionally, the workpiece is connected on its circumferential surfaces to a sawing beam, into which the sawing wire cuts after having sliced through the workpiece.

The sawing beam may for example be a graphite beam or epoxy beam, which is adhesively bonded or cemented onto the circumferential surface of the workpiece. Lastly, the workpiece with the sawing beam is cemented onto the table.

After the slicing, the sliced wafers remain fixed on the sawing beam like the teeth of a comb and thus can be taken out of the wire saw. Subsequently, the remaining sawing beam is removed from the wafers.

In the prior art, the problem arises during wire sawing that the sawing wire experiences a different degree of wear as a function of the incision length. With respect to the term incision length, reference will be made to FIG. 3 and the associated description.

In order to avoid this, it is proposed in U.S. Pat. No. 6,109,253 A to keep the table forward feed constant during the sawing process and to adapt the (effective) speed of the sawing wire according to the incision length. There is intended to be a proportional relation between the wire speed and the incision length. When slicing semiconductor wafers with sizeable diameters from a crystal, for example 300 mm wafers, a table forward feed being kept constant is however disadvantageous since the total thickness variance (TTV) of the semiconductor wafers is thereby increased in the region of the greatest incision lengths. A constant table forward feed, as disclosed in U.S. Pat. No. 6,109,253 A, is therefore undesirable.

JP 9262826 A on the other hand teaches to vary the table forward feed as a function of the incision length. At the start of the cutting process, this leads to initially increased wire wear which is subsequently reduced by lowering the table forward feed. Ideally the wire wear decreases linearly. The described method thus leads as before to inhomogeneous, albeit linearly decreasing wire wear.

SUMMARY OF THE INVENTION

It was therefore an object of the invention to achieve uniform wear of the sawing wire over the wire length, but at the same time to avoid the disadvantages of the methods disclosed in the prior art. These and other objects are achieved by a method for slicing a multiplicity of wafers from a workpiece which has a longitudinal axis and a cross section, the workpiece fastened on a table being fed by a relative movement directed perpendicularly to the longitudinal axis of the workpiece between the table and the wire gang of a wire saw, with a variable forward feed rate through the wire gang formed by a sawing wire moved with an effective speed, the effective speed of the sawing wire being regulated as a function of the forward feed rate and the workpiece's cross section so as to result in uniform wear of the sawing wire.

BRIEF DESCRIPTION OF THE DRAWINGS

FIG. 6 shows forward wire and backward wire movements.

DETAILED DESCRIPTION OF THE PREFERRED EMBODIMENT(S)

Figure 1:
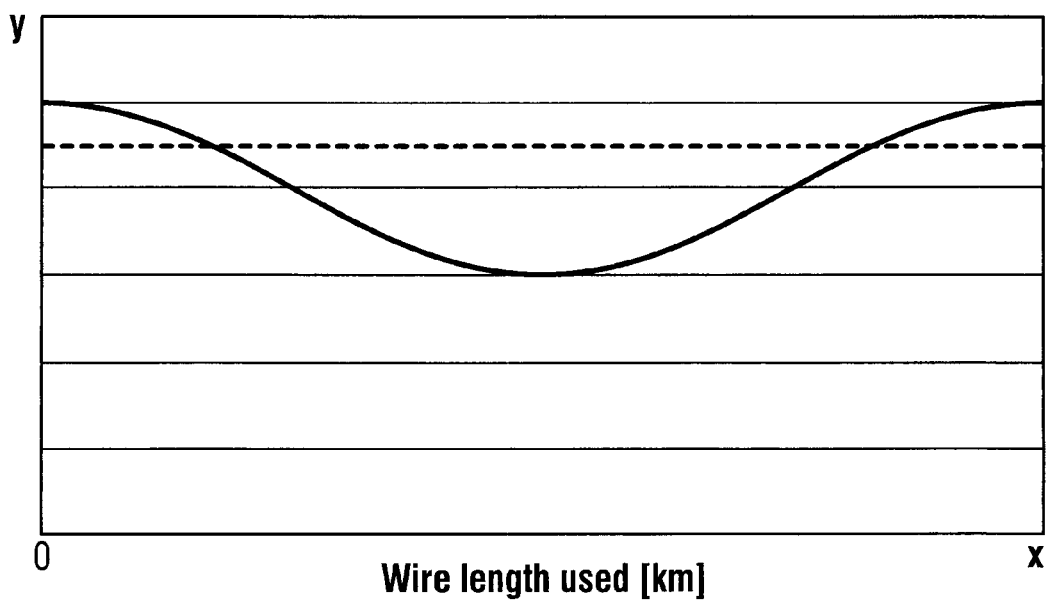
FIG. 1 represents the wire diameter as a function of the used length of wire for a method according to the prior art and for a method according to the invention.

The workpiece is preferably a cylindrical single crystal of silicon. The method is, however, also suitable for the sawing of non-cylindrical crystal blocks which comprise a circumferential surface, i.e. for example crystal blocks which have a square or rectangular cross section. Semiconductor materials, for example silicon, germanium, or gallium arsenide, are suitable as the workpiece material. It may also be polycrystalline material.

The sawing wire used preferably comes from a spool and is unwound several times (for example 300-400 times) around guide rolls so as to form a wire gang. At the exit of the wire gang, the used wire is preferably wound up on a further spool.

The sawing wire moves with an effective speed which can be varied during the sawing process on the wire saw, and preferably executes forward and backward movements cyclically. It is, however, also preferred for the sawing wire to be moved in only one direction.

The workpiece is preferably fastened on a table via a sawing beam, and is fed vertically from above into the wire gang. The forward feed rate of the table is varied according to the invention. It is preferably adjusted as a function of the table position. The effective speed of the sawing wire, i.e. for example the speeds of the forward and backward movements, can also be varied as a function of the table position.

The invention ensures uniform wear of the sawing wire by regulating the effective speed of the sawing wire during the sawing process on the wire saw as a function of the forward feed rate and workpiece cross section. To this end, an optimized effective wire speed is established for each table position. There is preferably a proportional relation between the effective wire speed and the product of incision length and forward feed rate of the table. There is preferably a proportional relation between the effective wire speed and the incision length.

If a forward movement and backward movement of the sawing wire are preferred, then the effective wire speed is regulated by establishing a forward profile and a backward profile of the wire movement as a function of the table position.

The invention will be explained in more detail below with reference to preferred embodiments.

In the scope of the invention, studies into the inhomogeneous wear of the sawing wire in the prior art will be presented first.

The wire movement preferably takes place cyclically or alternately forward and backward, i.e. for example 300 m forward and then 240 m backward, i.e. effectively at about 60 m per cycle forward. At the start of a cycle, the wire moves forward by a distance $\Delta x_v$ during the time span $\Delta t_v$ and immediately thereafter backward by a distance $\Delta x_r$ in the time span $\Delta t_r$. Within the cycle time of $\Delta t_z = \Delta t_v + \Delta t_r$, it therefore covers a distance of $\Delta x_z = \Delta x_v - \Delta x_r$ (see FIG. 2), and therefore moves with an effective speed $$v_{\text{eff}} := \frac{\Delta x_z}{\Delta t_z} = \frac{\Delta x_v - \Delta x_r}{\Delta t_v + \Delta t_r},$$

which is adjusted by corresponding selection of the forward and backward movements.

The table forward feed profile is preferably stored in the sawing program. This is done by establishing the desired forward feed rate as a function of the table position y.

An eroded volume Z is given by the average cutting width D and the area of the workpiece over which the wire sweeps. For a cylindrical workpiece, this gives for example (cf. FIG. 3):

$$Z = D * 2\pi R^2.$$

For a given table position y, the wire will have covered only a part of the area to be swept. This may be represented as a function of the table position as an integral of the incision length. The corresponding eroded volume is given by:

$$z(y) = D \int_0^y l(\psi) \, d\psi.$$

For the erosion rate $\dot{z}$, i.e. the material removal per unit time as a function of the table position, the following applies:

$$\dot{z} = \frac{\partial z}{\partial t} = \frac{\partial z}{\partial y} \frac{\partial y}{\partial t} = Dl(y)\dot{y}.$$

The wear of the sawing wire is preferably characterized by wire abrasion and a corresponding change in the diameter. For the wear a at a wire position x, the following applies:

$$a(x) = f(y) \frac{1}{v_{\text{eff}}}$$

Here, f describes all the factors relevant to the wear at a table position. a(x) is kept constant, i.e. independent of x, so that uniform wear of the sawing wire results according to the invention.

As a condition for the effective speed of the wire, the following preferably applies:

$$f(y) \frac{1}{v_{\text{eff}}} = \text{const.}$$
$$\Leftrightarrow v_{\text{eff}} \propto f(y)$$

An optimal effective wire speed can therefore be determined for each table position.

The following procedure is preferably adopted for finding the optimal effective wire speeds and determining the corresponding forward and backward wire movements.

According to a first preferred embodiment, the optimal effective wire speeds are determined by the wear of the sawing wire on a wire portion being proportional to the eroded volume and selecting the effective wire speed so as to obtain the following relation:

$$v_{\text{eff}} \propto Dl(y)\dot{y}$$

Thus, there is preferably a proportional relation between the effective speed of the sawing wire and the product of incision length and forward feed rate.

According to a second preferred embodiment, the wear of the wire at a position x is proportional to the time which this wire position spends in engagement. Since the table forward feed varies only very slowly in comparison with the wire position, the length of the incision changes only little during the cycles in which a wire position moves forward and backward through the workpiece. The time which the wire segment spends moving forward and backward in the incision corresponds approximately to the time which this wire position needs in order to cover the current cutting length with its effective speed:

$$a(x) \propto l \frac{1}{v_{\text{eff}}}.$$

There is preferably a proportional relation between the effective wire speed and the incision length. This is already known in the prior art for constant forward feed rates. In the scope of this invention, however, variable forward feed rates are assumed.

According to another preferred embodiment, the force density is kept constant: The wear a(x) is proportional to the force density f, which acts on the wire position during the time $t = l/v_{\text{eff}}$ which the wire position acts in the incision.

The force on the wire at a position x depends in turn on the table forward feed force $F_t(y)$ as well as on the instantaneous incision length $l(y)$:

$$f = \frac{F_t}{l}$$

This gives the following for the wear:

$$a(x) \propto \frac{F_t}{l} \frac{l}{v_{eff}} = \frac{F_t}{v_{eff}}$$

Measurement of the applied feeding force are carried out and regulation of the effective speed $v_{eff}$ of the sawing wire is preferably realized as a function of this measured force:

$$v_{eff} \propto F_t$$

For regulating the effective wire speed according to the invention, a forward profile and a backward profile of the wire movement are preferably determined.

More homogeneous wire wear is achieved by the method according to the invention compared with the prior art. In the method according to the invention, the wafers are preferably sliced with the use of a slurry.

Since the sawing wire is conventionally provided with a brass layer before its first use, the effect of which is that the container holding a slurry becomes contaminated with copper atoms after a first sawing process, it is preferable to replace the contaminated slurry container by an uncontaminated slurry container with fresh slurry for the second sawing process. In the second and subsequent sawing processes, no contamination of the second slurry container takes place since the brass layer has been removed. In the prior art, this is not possible owing to inhomogeneous wire wear.

Another advantage of the method according to the invention is therefore that the sawing wire can be used several times and introduction of copper into the sawing slurry is prevented from the second use of the sawing wire onward.

Preferably, the sawing wire is deployed via an entry spool, fed around guide rolls so as to form the wire gang, and finally wound up on an exit spool. The entry and exit spools are preferably exchanged before a second sawing process.

As an alternative, it is preferable for the sawing wire to be moved effectively in the other direction during the second sawing process relative to the first sawing process. Thus, if the first sawing process involves an effective forward movement of the sawing wire, then the forward and/or backward movement profiles for the second and subsequent sawing processes are modified so as to result in an effective backward movement of the sawing wire.

FIG. 1 shows the wire wear in methods according to the prior art by a variation in the wire diameter as a function of the wire length used. The wire wear in a method according to the invention, with regulation of the effective speed of the sawing wire, is furthermore represented. A significant difference from the prior art can be seen. The inhomogeneous wire wear observed in the prior art can be eliminated in the method according to the invention.

Figure 2:
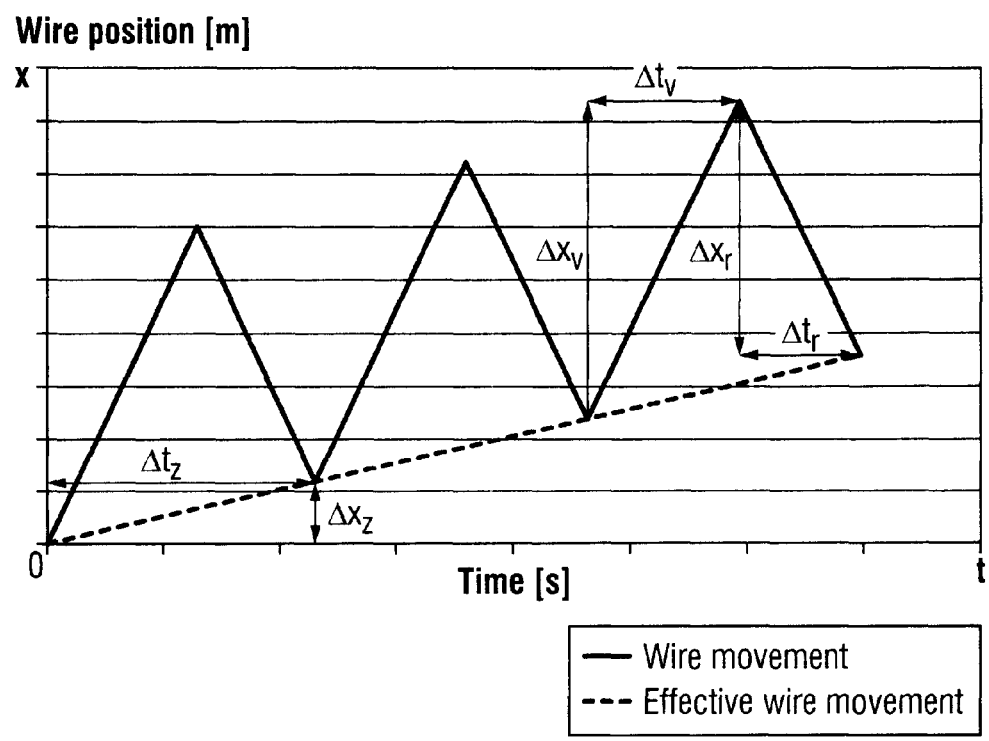
FIG. 2 shows the wire movement as a function of time, as well as the effective wire movement.

FIG. 2 shows the wire movement as a function of time. The forward and backward movement profiles of the sawing wire can be seen therein. The effective wire movement is furthermore represented. The effective wire movement or the wire position as a function of time is a strictly monotoneous increasing straight line. The gradient of this straight line corresponds to the effective speed of the sawing wire at the observed table position. The acceleration phases have not been depicted for simpler representation.

Figure 3:
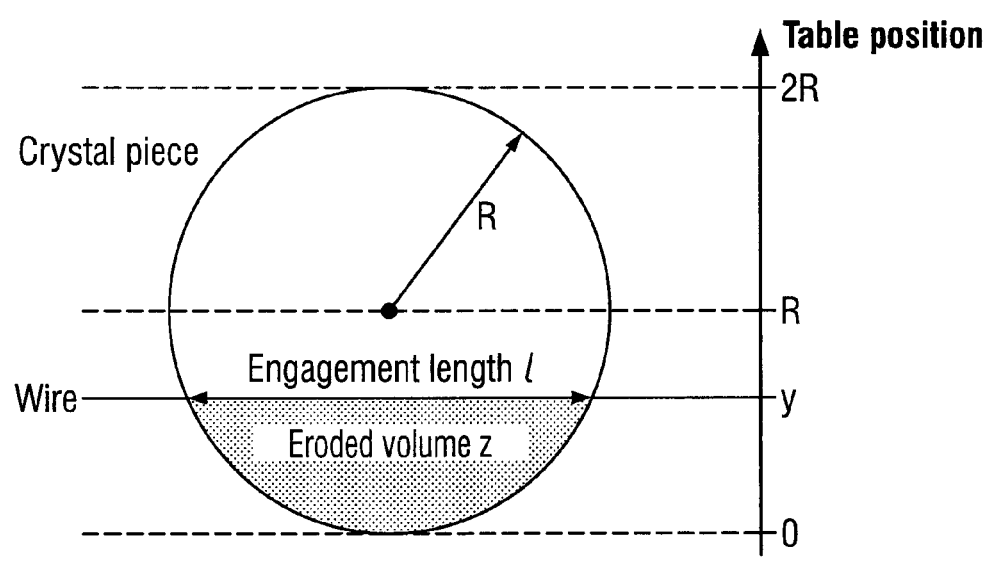
FIG. 3 shows a crystal piece of radius R as well as the incision length and also the eroded volume for a particular table position y.

FIG. 3 represents a workpiece of radius R. The table position, which varies from 0 to 2R, is furthermore shown. At the current table position y, we have the incision length l and the marked eroded volume z. It is also apparent therefrom that the incision length l and the eroded volume z are functions of the table position y. The incision length l as a function of the table position, and therefore of the table forward feed profile, has a substantial effect on the wear of the sawing wire. In the method according to the invention, the effective speed of the sawing wire is regulated via its forward and backward movement profiles (cf. FIG. 2) so that the dependency of the wire wear on the wire position (cf. FIG. 1), as observed in the prior art, is avoided and constant wire wear independent of the wire position is achieved.

Figure 4:
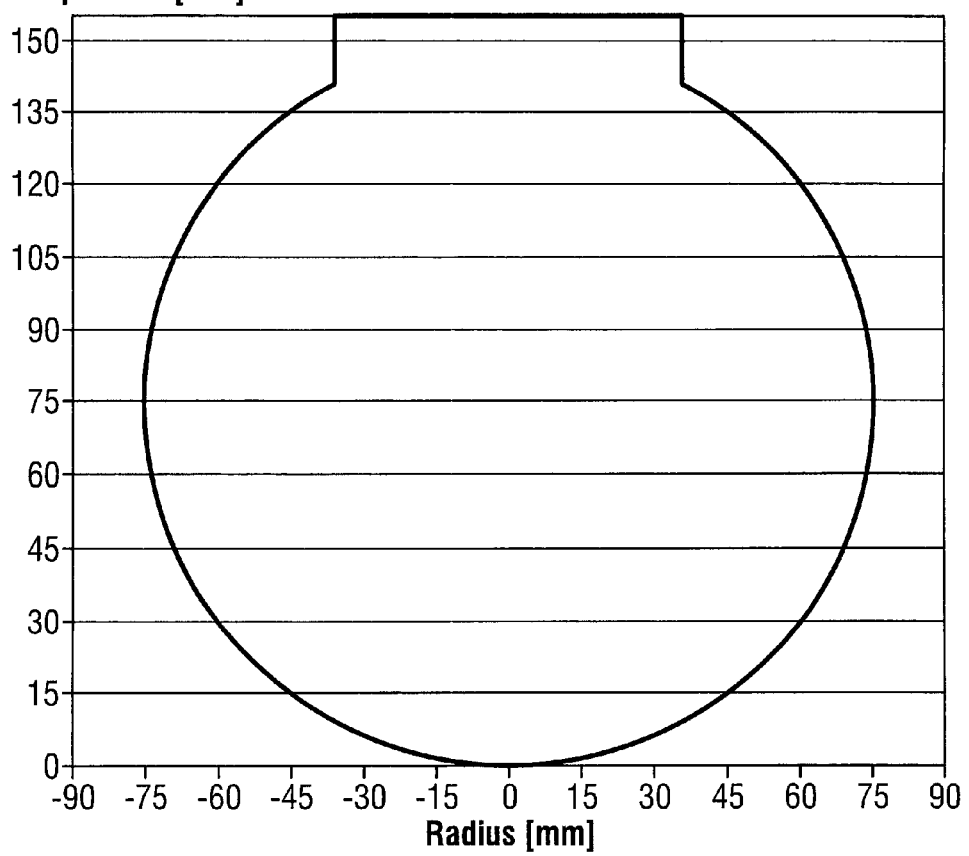
FIG. 4 shows a workpiece with a sawing beam.

FIG. 4 shows a crystal piece having a diameter of 150 mm, which is connected to a sawing beam in the upper region.

Figure 5:
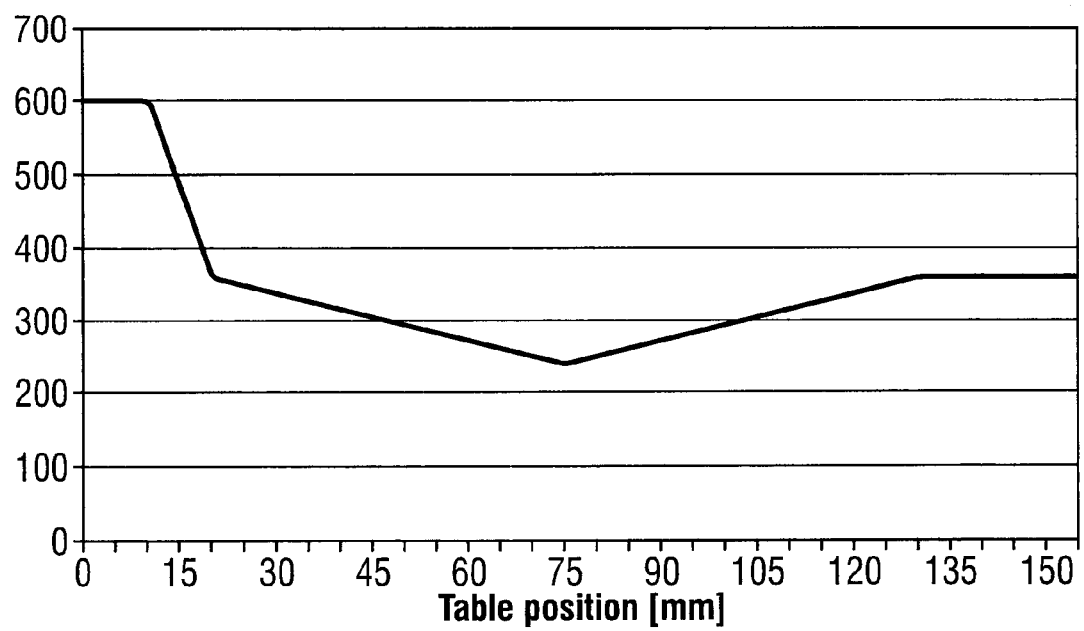
FIG. 5 shows a table forward feed profile.

FIG. 5 shows a table forward feed profile, i.e. table forward feed rates in μm/min as a function of the table position in mm, which is suitable in a method according to the invention for slicing wafers from a crystal piece having a diameter of 150 mm.

FIG. 6 shows the cyclic forward wire movements and backward wire movements according to the invention as a function of the table position. In this case, for the table forward feed profile in FIG. 5, it was required that 30 cycles should be executed per 10 mm of forward feed so that a uniform groove pattern is formed on the wafer.

Example

A crystal piece having a diameter of 150 mm was fastened on a sawing beam having a width of 70 mm (cf. also FIG. 4).

The table forward feed profile was specified according to Table 1 (linear interpolation was carried out between the support points, cf. also FIG. 5).

TABLE 1

| Table position (mm) | Table forward feed rate (μm/min) |
|---|---|
| 0 | 600 |
| 10 | 600 |
| 20 | 360 |
| 75 | 240 |
| 130 | 360 |
| 155 | 360 |

For this cutting, 20 km of wire were available, the wire speed was at most 12 m/s and the acceleration when reversing direction was 3 m/s². The optimized wire movements represented in FIG. 6 were produced by the wire program represented in Table 2, with the assumption that the wire wear is proportional to the eroded volume and the requirement that 30 cycles should be executed per 10 mm of forward feed.

TABLE 2

| Table position (mm) | Wire movement forward per cycle (m) | Wire movement backward per cycle (m) |
|---|---|---|
| 0 | 132 | 132 |
| 1 | 136 | 128 |
| 5 | 141 | 123 |
| 10 | 144 | 120 |
| 15 | 192 | 162 |
| 20 | 269 | 235 |

TABLE 2-continued

| Table position (mm) | Wire movement forward per cycle (m) | Wire movement backward per cycle (m) |
|---|---|---|
| 30 | 291 | 252 |
| 40 | 315 | 271 |
| 60 | 372 | 324 |
| 75 | 427 | 377 |
| 90 | 372 | 324 |
| 110 | 315 | 271 |
| 120 | 291 | 252 |
| 130 | 269 | 235 |
| 135 | 267 | 237 |
| 140 | 264 | 240 |
| 142 | 264 | 240 |
| 150 | 264 | 240 |
| 155 | 264 | 240 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for slicing a multiplicity of wafers from a workpiece which has a longitudinal axis and a cross section, the workpiece fastened on a table being fed by a relative movement directed perpendicularly to the longitudinal axis of the workpiece between the table and a wire gang of a wire saw, with a variable forward feed rate through the wire gang formed by a sawing wire moved with an effective speed, the effective speed of the sawing wire being regulated as a function of the forward feed rate and the workpiece cross section so as to result in uniform wear of the sawing wire.

2. The method of claim 1, wherein the effective speed of the sawing wire is established as a function of an incision length of the sawing wire into the workpiece.

3. The method of claim 1, wherein the effective speed of the sawing wire is adjusted so that there is a proportional relation between the effective wire speed and the incision length.

4. The method of claim 1, wherein the effective speed of the sawing wire is adjusted so that there is a proportional relation between the effective wire speed and the product of table forward feed rate and incision length.

5. The method of claim 1, wherein the effective speed of the sawing wire is adjusted so that there is a proportional relation between the effective wire speed and the application force.

6. The method of claim 1, wherein the sawing wire is used for a further sawing process after the end of a sawing process.

7. The method of claim 6, wherein the sawing wire is used more than two times.

8. The method of claim 6, wherein the wafers are sliced with the use of a slurry.

9. The method of claim 6, wherein the sawing wire is deployed via an entry spool, fed around guide rolls so as to form the wire gang, and finally wound up on an exit spool, the entry and exit spools being exchanged before a second sawing process.

10. The method of claim 6, wherein the sawing wire is moved effectively in an opposite direction during the second sawing process relative to the first sawing process.

11. The method of claim 9, wherein the sawing wire is provided with a brass layer before its first use, the effect of which is that the container holding a slurry becomes contaminated with copper atoms after a first sawing process, the contaminated slurry container is furthermore replaced by an uncontaminated slurry container for the second sawing process and no contamination of the second slurry container takes place during the second sawing process.

* * * * *